（12）United States Patent
Dressel (10) Patent No.: US 8,482,816 B2
(45) Date of Patent: Jul. 9, 2013

(54) DOCUMENT ACQUISITION SYSTEM AND DOCUMENT ACQUISITION METHOD

(75) Inventor: Olaf Dressel, Wustermark (DE)

(73) Assignee: Bundesdruckerei GmbH, Berlin (DE)

( * ) Notice: Subject to any disclaimer, the term of this patent is extended or adjusted under 35 U.S.C. 154(b) by 840 days.

(21) Appl. No.: 12/651,716

(22) Filed: Jan. 4, 2010

(65) Prior Publication Data

US 2010/0103483 A1 Apr. 29, 2010

Related U.S. Application Data

(63) Continuation of application No. PCT/EP2008/005554, filed on Jul. 3, 2008.

(30) Foreign Application Priority Data

Jul. 4, 2007 (DE) .......................... 10 2007 031 230

(51) Int. Cl.
*H04N 1/04* (2006.01)
*H04N 5/33* (2006.01)
*H04N 5/228* (2006.01)
*H04N 5/217* (2011.01)
*H04N 5/225* (2006.01)
*H01J 5/16* (2006.01)

(52) U.S. Cl.
USPC ........... 358/475; 359/619; 348/241; 348/164; 348/335; 348/222.1; 250/226

(58) Field of Classification Search
USPC ................... 358/475; 359/619; 348/241, 164, 348/335, 221.1; 250/226
See application file for complete search history.

(56) References Cited

U.S. PATENT DOCUMENTS

| 6,002,743 | A | 12/1999 | Telymonde |
| 6,215,594 | B1 * | 4/2001 | Inoguchi et al. ............... 359/619 |
| 6,643,067 | B2 * | 11/2003 | Miyamae et al. ............. 359/619 |
| 6,714,323 | B1 | 3/2004 | Onishi et al. |
| 6,771,396 | B1 | 8/2004 | Cheatle et al. |
| 7,345,747 | B2 | 3/2008 | Hillmann et al. |

(Continued)

FOREIGN PATENT DOCUMENTS

| DE | 101 37 013 A1 | 2/2003 |
| EP | 0675466 A2 | 10/1995 |

(Continued)

OTHER PUBLICATIONS

Duparré, et al., "Thin compound-eye camera", article, May 20, 2005, pp. 2949-2954, vol. 44, No. 15, Applied Optics, Optical Society of America.

(Continued)

*Primary Examiner* — Charlotte M Baker
*Assistant Examiner* — Rury Grisham
(74) *Attorney, Agent, or Firm* — Laurence A. Greenberg; Werner H. Stemer; Ralph E. Locher (57) ABSTRACT

A document acquisition system and a document acquisition method for optically acquiring a document, include at least one luminous device for illuminating the document, at least one optical sensor and an optical imaging unit for imaging the document onto the at least one optical sensor. The at least one illumination device is coupled to an optical lighting unit which allows the document to be illuminated as homogeneously as possible.

10 Claims, 3 Drawing Sheets

U.S. PATENT DOCUMENTS

| | | |
|---|---|---|
| 2003/0031342 A1 | 2/2003 | Sperl et al. |
| 2004/0211904 A1 | 10/2004 | Scowen et al. |
| 2007/0285553 A1* | 12/2007 | Morita et al. .................. 348/335 |
| 2008/0158377 A1* | 7/2008 | Chanas et al. .............. 348/222.1 |
| 2009/0140131 A1* | 6/2009 | Utagawa ........................ 250/226 |
| 2011/0109749 A1* | 5/2011 | Chanas et al. ................. 348/164 |
| 2012/0140097 A1* | 6/2012 | Morita et al. .................. 348/241 |

FOREIGN PATENT DOCUMENTS

| | | |
|---|---|---|
| EP | 1037173 A1 | 9/2000 |
| EP | 1 248 224 A2 | 10/2002 |
| EP | 1 589 496 A1 | 10/2005 |
| JP | 11-146132 A | 5/1999 |
| JP | 2000-138796 A | 5/2000 |
| WO | 84/02046 A1 | 5/1984 |

OTHER PUBLICATIONS

Duparré, et al., "Artificaion apposition compound eye fabricated by micro-optics technology", article, Aug. 1, 2004, pp. 4303-4310, vol. 43, No. 22, Applied Optics, Optical Society of America.

* cited by examiner

DOCUMENT ACQUISITION SYSTEM AND DOCUMENT ACQUISITION METHOD

CROSS-REFERENCE TO RELATED APPLICATION

This is a continuation application, under 35 U.S.C. §120, of copending International Application No. PCT/EP2008/005554, filed Jul. 3, 2008, which designated the United States; this application also claims the priority, under 35 U.S.C. §119, of German Patent Application DE 10 2007 031 230.1-31, filed Jul. 4, 2007; the prior applications are herewith incorporated by reference in their entirety.

BACKGROUND OF THE INVENTION

Field of the Invention

The invention relates to a document acquisition system and a document acquisition method for optically acquiring a document, in particular a personal document, including at least one luminous device for illuminating the document, at least one optical sensor and an optical imaging unit for imaging the document onto the at least one optical sensor. The invention relates in particular to a document acquisition system and a document acquisition method for verifying documents, for example for examining authenticity.

It is known from the prior art to acquire or record documents, for example passports, through the use of one or more cameras. An optical imaging unit is required to image the document onto one or a plurality of cameras. Such a document acquisition system is known, for example from International Publication No. WO 84/02046, in which a plurality of video cameras are disposed in a housing under a transparent digitization surface, which will also be referred to as a document placement area in the following text. The document can be digitally acquired on the basis of the images recorded by the individual video cameras, with the regions of the document acquired by the cameras overlapping one another in such a way that a correction with respect to the offset is necessary.

U.S. Pat. No. 6,771,396 B1 discloses a method for calibrating an image acquisition system and subsequent acquisition of an image of a document. During the acquisition, the camera sequentially records individual sections of the document which overlap respectively neighboring sections. In order to be able to assemble the individual recorded sections of the document to form an image of the document, distortions of the individual sections need to undergo computational corrections. For that purpose, features from correspondingly recorded sections of a regular calibration configuration are used, which include a plurality of mutually spaced apart features that are provided with a previously known orientation and disposed in the acquisition region of a document acquisition device.

U.S. Pat. No. 6,002,743 discloses an image recording system in which a plurality of cameras or image sensors are disposed in an array, which includes rows and columns, in such a way that the viewing regions of the cameras which are disposed in such a way that they adjoin one another, respectively overlap.

In all of the described systems, one or more optical elements of an optical imaging unit are necessary for imaging the document onto the camera or cameras, or the optical sensor or sensors. Document acquisition systems in which an optical imaging unit including a microlens array is used together with an electronic optical sensor have been constructed in order to provide document acquisition systems which have only a small extent perpendicular to the document plane, i.e. are flat.

Systems of that type are described, for example in the article "Artificial Apposition Compound Eye Fabricated by Micro-Optics Technology" by Jacques Duparré et al., Applied Optics, vol. 43, no. 22, pages 4303 to 4310, Aug. 1, 2004, and the article "Thin Compound-Eye Camera" by Jacques Duparré et al., Applied Optics, vol. 44, no. 15, pages 2949 to 2956, May 20, 2005. The microlens arrays described therein are disposed on a spacer layer or directly formed thereon. The spacer layer in turn is disposed on the CMOS sensor. Apertures can be provided between the microlenses and the spacer layer. Pinhole diaphragms can be provided on those ends of the spacer layer which are remote from the microlenses. In that case, one pinhole diaphragm is preferably associated with each microlens. The viewing regions of individual optical channels or of the fields of vision imaged by the individual microlenses, and thus the entire viewing region of the microlens array, are defined by way of an alignment of the pinhole diaphragms with respect to the microlenses. One optical channel is associated with each microlens in this case. In order to avoid cross-talk of neighboring channels, individual optical channels can be formed in the spacer layer which are separated from one another by way of opaque walls. The occurrence of ghost images due to cross-talk can thus be avoided. The acquisition systems which are formed through the use of an electronic optical sensor and an optical imaging unit including a microlens array have only a very small structural depth. The spacer layer and the microlens array can have dimensions of less than 1 mm, preferably of about 350 μm. In order to completely acquire an identity document, such as a passport, using such an acquisition system, a very extensive microlens array and a correspondingly large electronic optical sensor would be necessary. However, those are technically impossible to realize at the moment. Moreover, it is difficult to achieve homogeneous lighting of the document. Therefore, the use of a plurality of acquisition systems disposed in a grid is conceivable in order to be able to acquire large-area documents. However, lighting the document is difficult, in particular between the acquisition sensors.

U.S. Pat. No. 6,714,323 B1 discloses a document acquisition apparatus having an optical lighting unit and an optical imaging unit with which a document can be acquired in a strip-wise manner.

SUMMARY OF THE INVENTION

It is accordingly an object of the invention to provide a document acquisition system and a document acquisition method, which overcome the hereinafore-mentioned disadvantages of the heretofore-known systems and methods of this general type and which have a small extent perpendicular to a document plane and permit as quick and complete an acquisition as possible.

With the foregoing and other objects in view there is provided, in accordance with the invention, a document acquisition system for optically acquiring a document. The document acquisition system comprises at least one luminous device for illuminating the document, an optical lighting unit coupled to the at least one luminous device for permitting homogeneous lighting of the document, at least one optical sensor, an optical imaging unit for imaging the document onto the at least one optical sensor, further optical sensors disposed together with the at least one optical sensor in a grid, an imaging microlens array associated with the at least one optical sensor, further imaging microlens arrays each being associated with a respective one of the further optical sensors, further luminous devices disposed with the at least one luminous device next to one other and/or between the at least one optical sensor and the further optical sensors, the optical lighting unit including at least one lighting microlens array for the at least one luminous device and further lighting microlens arrays each for a respective one of the further luminous devices, and the imaging microlens array and/or the further imaging microlens arrays and the at least one lighting microlens array and/or the further lighting microlens arrays being mechanically connected to one another.

With the objects of the invention in view, there is also provided a method for optically acquiring a document using a document acquisition system. The method comprises lighting the document with at least one luminous device and an optical lighting unit coupled to the at least one luminous device for lighting the document homogeneously, imaging the document onto at least one optical sensor with an optical imaging unit, acquiring an image of the document with the at least one optical sensor, providing an imaging microlens array associated with the at least one optical sensor, further optical sensors disposed together with the at least one optical sensor in a grid and further imaging microlens arrays each associated with a respective one of the further optical sensors, for carrying out the step of acquiring the image of the document with the at least one optical sensor, providing further luminous devices disposed next to one another and/or between the at least one optical sensor and the further optical sensors, for carrying out the step of lighting of the document along with the at least one luminous device, providing the optical lighting unit with at least one lighting microlens array for the at least one luminous device and further lighting microlens arrays each for a respective one of the further luminous devices, for carrying out the step of lighting the document, and mechanically connecting the imaging microlens array and/or the further imaging microlens arrays and the at least one lighting microlens array and/or the further lighting microlens arrays to one another.

In order to enable a quick and reliable acquisition of a document, the document must be lit homogeneously. As a result, necessary correction calculations with respect to the brightness of the individual image points can then be saved. In an apparatus mentioned in the introduction, provision is therefore made for the at least one luminous device to be coupled to an optical lighting unit which enables as homogeneous a lighting of the document as possible. It is possible by using an optical lighting unit to direct the radiation emitted by the at least one luminous device onto the document in such a way that the latter is homogeneously lit. Homogeneous lighting in this case is understood to mean lighting which produces image points of the same intensity on the relevant optical sensor, provided that the document is homogeneous.

In order to achieve such lighting of the document, provision is made for the optical lighting unit to include at least one lighting microlens array. It is possible by using a lighting microlens array to direct the radiation emitted by the at least one luminous source to individual regions of the document in a targeted manner. Such an optical lighting unit furthermore has a very low structural height and can thus be easily integrated in a flat document acquisition system.

It has proven advantageous in the case of large-area documents to place further optical sensors together with the at least one optical sensor in a grid and to place the one luminous device and further luminous devices in an adjacent manner and/or between the at least one optical sensor and the further optical sensors. This means that the at least one luminous device and typically further luminous devices are disposed in particular between the optical sensors.

Provision is made in this case to construct the optical lighting unit in such a way that for the at least one luminous device and the further luminous devices in each case one lighting microlens array is provided. It thus becomes possible for the radiation emitted by the at least one luminous device and the further luminous devices to be directed in each case optimally with respect to homogeneous lighting of the document onto the latter. Each luminous device can optimally light a corresponding region through an associated lighting microlens array.

In order to obtain a document acquisition system of simple construction, the one imaging microlens array is associated with the at least one optical sensor and in each case one further imaging microlens array is associated with the further optical sensors.

It is advantageous from a manufacturing point of view to place the microlenses of the lighting microlens array or arrays in one plane. This primarily offers the possibility of aligning the individual lighting microlens arrays with respect to one another and in particular with respect to the imaging microlens arrays. It is advantageous especially when the aim is to achieve a non-overlapping but complete image of the document using a plurality of optical sensors to mechanically interconnect an imaging microlens array and/or the further imaging microlens arrays and the at least one lighting microlens array and/or the further lighting microlens arrays. A possible misalignment of the optical elements with respect to one another is thereby avoided. Furthermore, the alignment of the individual luminous devices with respect to one another and of the luminous devices with respect to the optical sensors and of the optical sensors with respect to one another is simplified. These must in each case be aligned only with respect to their corresponding imaging microlens array or lighting microlens array and are then automatically correctly aligned with respect to the other luminous device or optical sensors.

In accordance with another feature of the invention, it is possible to achieve reliable relative alignment with respect to one another and optimum mechanical connection of the imaging microlens arrays and/or further imaging microlens arrays and of the at least one lighting microlens array and/or of the further lighting microlens arrays by forming them together on a carrier material. The carrier material preferably serves as a spacer layer, at least between the microlenses of the imaging microlens array and the optical sensors.

In one preferred embodiment, the microlenses of the at least one lighting microlens array are diverging lenses. The radiation emitted by a punctiform or small-area or small-volume luminous device can thus be fanned out in order to homogeneously light the entire document or, in the case where a plurality of luminous devices are used, regions of the document.

The signals acquired by the optical sensor or the plurality of optical sensors are supplied to an evaluation unit which evaluates the image data with respect to a document verification. It is possible in this case to acquire the data of the plurality of optical sensors at the same time and for the evaluation device to evaluate them together. It is likewise possible to record the document in a temporally offset manner through the use of the plurality of optical sensors and to subsequently evaluate the data thus obtained.

In accordance with a further feature of the invention, in order to also be able to evaluate security features in the case of a verification which requires illumination using electromagnetic radiation of varying wavelength spectra, provision is made in one preferred embodiment for one or more additional luminous devices to be coupled to the optical lighting unit in such a way that the document can be lit additionally or alternatively using the radiation emitted by the one or the plurality of additional luminous devices, with the one or the plurality of additional luminous devices emitting the electromagnetic radiation with a spectrum which differs from the spectrum of the electromagnetic radiation of the at least one luminous device and/or the further luminous device.

In accordance with an added feature of the invention, the at least one luminous device, the further luminous devices and/or the additional luminous devices are preferably constructed as LEDs or laser diodes. These light sources offer a higher quantum yield and thus have a relatively low power loss, in such a way that the heat occurring when producing the electromagnetic radiation is kept low and can be conducted away well from the document acquisition system.

The at least one luminous device, the further luminous devices and/or the one or more additional luminous devices emit electromagnetic radiation in the infrared wavelength range, in the visible wavelength range and/or in the ultraviolet wavelength range. The wavelength is in each case matched to the security features of the documents to be verified.

In accordance with an additional feature of the invention, alternatively and/or in addition to lighting the document with electromagnetic radiation of varying wavelengths, it may also be advantageous to construct the optical lighting unit in such a way that the document can be lit simultaneously or in a temporally offset manner using, on one hand, electromagnetic radiation of the at least one luminous device and of the further luminous devices at a first illumination angle and, on the other hand, the electromagnetic radiation of the additional luminous device at a second illumination angle which is different from the first illumination angle. As a result, specific security features can be selectively imaged onto documents. In this embodiment, the at least one luminous device, the further luminous devices and the additional luminous devices can emit radiation in the same spectral wavelength range or in varying spectral wavelength ranges.

In accordance with yet another feature of the invention, particularly homogeneous lighting of the document is achieved by way of an embodiment in which at least one microlens of the optical lighting unit corresponds to each document region imaged by using a microlens of the optical imaging unit. It is thus possible to realize pixel-accurate, i.e. image-point-accurate or image-channel-accurate, lighting and imaging.

In accordance with a concomitant feature of the invention, in order to control a light intensity which is imaged by way of one of the microlenses of the lighting microlens array, it is possible for apertures or stops in front of the individual microlenses to be provided which have varying aperture or stop diameters. This is advantageous, inter alia, if the areas of the document regions which are lit by the individual microlenses of the lighting microlens array are of different sizes.

The steps of the method according to the invention have the same advantages as the corresponding features of the document acquisition system.

Other features which are considered as characteristic for the invention are set forth in the appended claims.

Although the invention is illustrated and described herein as embodied in a document acquisition system and a document acquisition method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
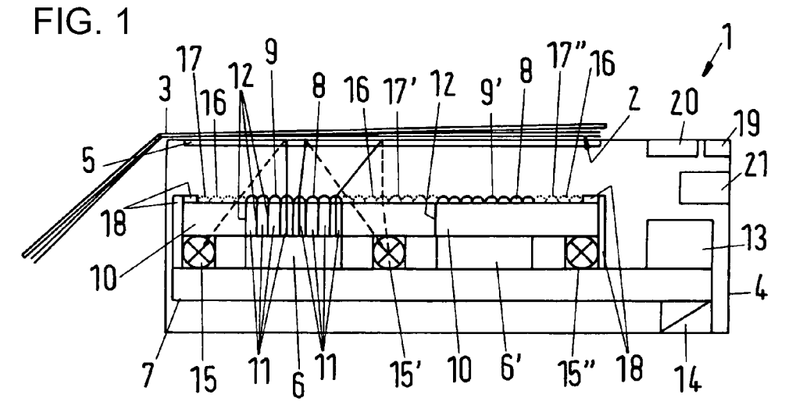
FIG. 1 is a diagrammatic, semi-circular, sectional view of a document acquisition system for the verification of documents.

Referring now to the figures of the drawings in detail and first, particularly, to FIG. 1 thereof, there is seen a document acquisition system 1. The system is used to verify a document 2, for example a page in a passport 3. The document acquisition system 1 includes a housing 4 which incorporates a document placement surface 5. The document placement surface 5 is preferably made from a transparent material, such as glass or PLEXIGLAS or another transparent plastic. The document 2 to be verified is disposed on the document placement surface 5 in such a way that it bears against the latter.

In order to provide for the acquisition of the document 2, optical sensors 6, 6' are disposed on a carrier structure 7, preferably constructed as a printed circuit board. The optical sensors 6 are disposed on the carrier structure 7 preferably in a matrix-type grid. The optical sensors 6, 6' are preferably CMOS sensors or CCD camera sensors. In principle, any electronic sensor can be used which can acquire, in a pixelated fashion, at least varying brightness values for the imaged image regions of the document 2 and can convert them into electronic signals.

In order to image the document 2 onto the optical sensors 6, 6', an optical imaging unit 8 is provided which includes imaging microlens arrays 9, 9' that are represented in the illustrated embodiment by using continuous lines.

In this case, each of the imaging microlens arrays 9, 9' is associated with a respective one the optical sensors 6, 6'. The individual microlenses of the microlens arrays 9, 9' are formed on a substrate 10 which serves as a spacer element and is disposed between the microlenses of the microlens array 9 and the corresponding optical sensors 6, 6'. The substrate 10 may be patterned in such a way that for each microlens of a microlens array 9, a dedicated channel 11 is formed which is optically separated from neighboring channels 11 by way of non-transparent wall layers 12 in order to avoid optical crosstalk of the individual channels 11. For the optical sensor 6 (illustrated on the left in FIG. 1), the substrate 10 is patterned in an exemplary fashion into channels 11 which are separated by non-transparent wall layers 12, whereas the substrate 10, where it adjoins the microlens array 9' and the optical sensor 6' (illustrated on the right) is not patterned.

The image information acquired by the optical sensors 6, 6' is transmitted in the form of electrical signals to an evaluation unit 13. The evaluation unit 13 is constructed in such a way that it can produce an image of the document 2 on the basis of the electrical signals of the sensors 6, 6'. This image can be made available to a computer for example through an interface 14. The computer verifies the image, or parts thereof, such as for example a passport photo, a signature, a document number such as for example a passport number etc. using methods which are known in the art. The evaluation unit 13 can, however, also be constructed in such a way that the verification of individual security features or of all security features is carried out in the evaluation unit 13. To this end, the evaluation unit can receive required data through the interface 14 and read and call up, if desired, by another apparatus.

Lighting the document 2, in particular between the sensors 6, 6', has proven to be difficult. Therefore, in the embodiment shown, luminous devices 15, 15', 15" are disposed in a neighboring fashion and between the optical sensors 6, 6'. The luminous devices 15, 15', 15" are preferably constructed in the form of light-emitting diodes, laser diodes, OLEDs, etc. The wavelength spectra of the luminous devices 15, 15', 15" can range from the near infrared through the visible range into the UV range. The spectral distribution of the electromagnetic radiation produced by the luminous devices 15, 15', 15" is selected as a function of the type of the document 2 to be verified and of the security features it contains. Luminous devices 15, 15', 15" can in this case include various luminous sources which emit electromagnetic radiation of various wavelength ranges and produce a desired overall spectrum of the luminous devices 15, 15', 15". Alternatively and in addition, provision may be made for a variety of luminous devices 15, 15', 15" to be used in order to light the document using electromagnetic radiation of varying spectral distribution.

An optical lighting unit 16 is provided in order to homogeneously light the document 2, i.e. so that a document having a homogeneous surface produces a virtually identical signal at each image point of the associated optical sensor 6, 6'. In one preferred embodiment, as is shown in FIG. 1, the optical lighting unit 16 includes lighting microlens arrays 17, 17', 17" which are illustrated by using dotted lines. In the embodiment shown, in each case one corresponding lighting microlens array 17, 17', 17" is associated with each of the luminous devices 15, 15', 15". The construction of the lighting microlens arrays 17, 17', 17" is preferably such that at least exactly one microlens of a lighting microlens array 17, 17', 17" is associated with each microlens of an imaging microlens array 9, 9'. This means that each region of the document 2, which is imaged by using a microlens of the imaging microlens array 9, 9' on one of the optical sensors 6, 6', has associated with it one microlens of a lighting microlens array 17, 17', 17", which microlens directs electromagnetic radiation of the associated luminous devices 15, 15', 15" into that region of the document 2.

Pixel-accurate homogeneous lighting of the document is thereby possible. In other embodiments, provision may be made for one microlens of a lighting microlens array 17, 17', 17" to be associated with a plurality of image regions which are imaged by a plurality of microlenses of an imaging microlens array 9, 9'.

The person skilled in the art thus gathers that the semicircular sectional view through the microlenses both of the lighting microlens arrays 17, 17', 17" and of the imaging microlens arrays 9, 9' are merely intended to indicate microlenses diagrammatically rather than reflect the true form of the individual microlenses. These are calculated and formed in such a way that they are matched individually to the corresponding imaging geometry in the case of one preferred embodiment.

A metal layer which has cut-outs which act as apertures can be disposed between the individual microlenses both of the imaging microlens arrays 9, 9' and of the lighting microlens arrays 17, 17', 17" on one hand and the substrate 10 on the other hand. A metal layer with cut-outs which are constructed as pinhole diaphragms can likewise be provided at an opposite end of the substrate 10. It is possible in this manner, especially for the optical imaging unit 8, to define viewing regions of the channels, which are associated with the individual lenses, by way of the configuration of the pinhole diaphragms relative to the lens center points.

In order to achieve optimum alignment of the optical lighting unit 16 and of the optical imaging unit 8, it is advantageous if the imaging microlens arrays 9, 9' and the lighting microlens arrays 17, 17', 17" are formed on the same substrate 10. If the individual microlens arrays 9, 9', 17, 17', 17" are formed separately, it is advantageous to align them with respect to one another and to connect them.

Screening elements 18 can be provided in order to prevent the propagation of scattered light of the luminous devices 15, 15', 15". The illustrated screening elements 18 are shown only in an exemplary manner and can be spaced apart as desired or disposed in such a way that they rest against the luminous devices 15, 15', 15" in such a way that they adequately prevent a scattered-light propagation. It is furthermore advantageous to pattern the substrate 10 on which the lighting microlens arrays 17, 17', 17" and the imaging microlens arrays 9, 9' are formed and to insert non-transparent wall layers 12 which prevent scattered-light propagation to the optical sensors 6, 6'. This is indicated in an exemplary manner at the transition from the lighting microlens array 17' to the imaging microlens array 9'.

The document acquisition system 1 has one or more operating elements 19 and preferably a display element 20 which is constructed for example as an LCD display, for the operation of the document acquisition system. If the examined document 2 was verified as being genuine, this verification result can be displayed, for example, on the display element 20. The verification result can, however, also be output as an electronic signal through the interface 14. The document acquisition system has a power-supply unit 21 for an electric power supply. The latter can include batteries or rechargeable batteries or else a transformer-rectifier unit which can be operated while connected to an external AC voltage source. Operation while connected to an external DC voltage supply is likewise possible. The document acquisition system 1 is preferably constructed in such a way that the evaluation unit 13 includes a computer unit on which a control and regulation program in the form of program code is executed. The evaluation unit 13 or a separate control unit is used to control both the driving of the luminous devices 15, 15', 15" and the document acquisition through the use of the optical sensors 6, 6'.

Figure 2:
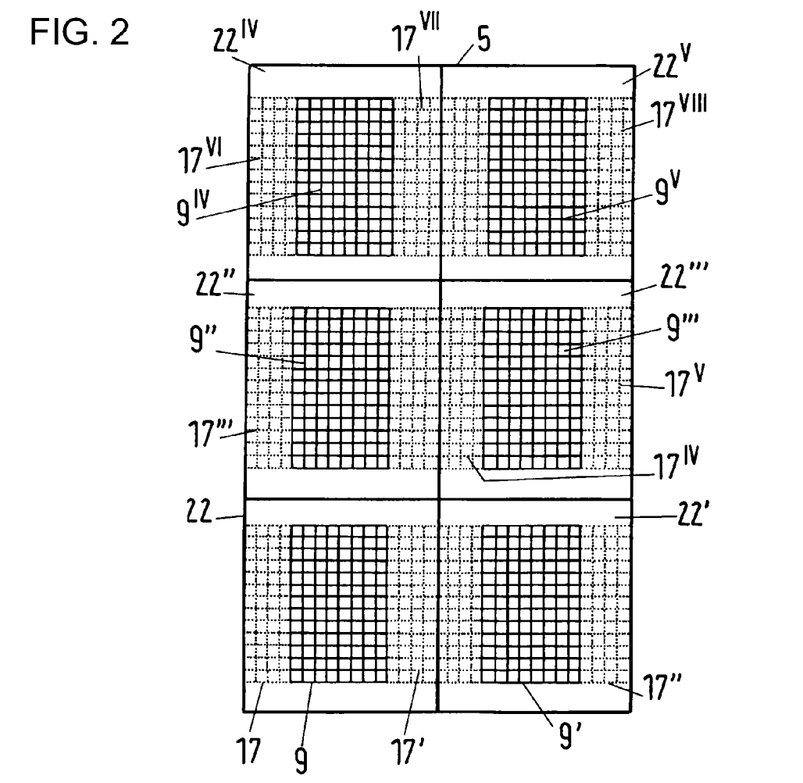
FIG. 2 is a plan view of a document placement surface of the document acquisition system according to FIG. 1 for the purpose of explaining acquisition regions of individual optical sensors and a configuration of an optical lighting unit and an optical imaging unit.

FIG. 2 diagrammatically shows a plan view onto the document placement surface 5. Acquisition regions 22-22$^V$ are illustrated, which are associated with individual optical sensors that are disposed in this case by way of example in a 2×3 grid which has two columns and three rows. In this case, the individual optical sensors are each aligned with respect to one another in such a way that the acquisition regions 22-22$^V$ adjoin one another without overlap. The imaging microlens arrays and lighting microlens arrays, which are located underneath the placement surface 5 and the microlenses of which are each indicated as squares, are likewise shown. The lighting microlens arrays $17\text{-}17^{VIII}$ are shown by dotted lines, whereas the imaging microlens arrays $9\text{-}9^V$ are indicated by using continuous lines. In the illustrated embodiment, the lighting microlens arrays $17'\text{-}17^{VIII}$ and imaging microlens arrays $9\text{-}9^V$ of two neighboring optical sensors $6\text{-}6^V$ are formed integrally on a substrate in each case. In other embodiments, all of the lighting microlens arrays $17'\text{-}17^{VIII}$ and all of the imaging microlens arrays $9\text{-}9^V$ are formed integrally, preferably on one substrate. The substrate can be patterned into individual channels which are optically isolated with respect to one another, in particular in the region of the imaging microlens arrays $9\text{-}9^V$.

Figure 3:
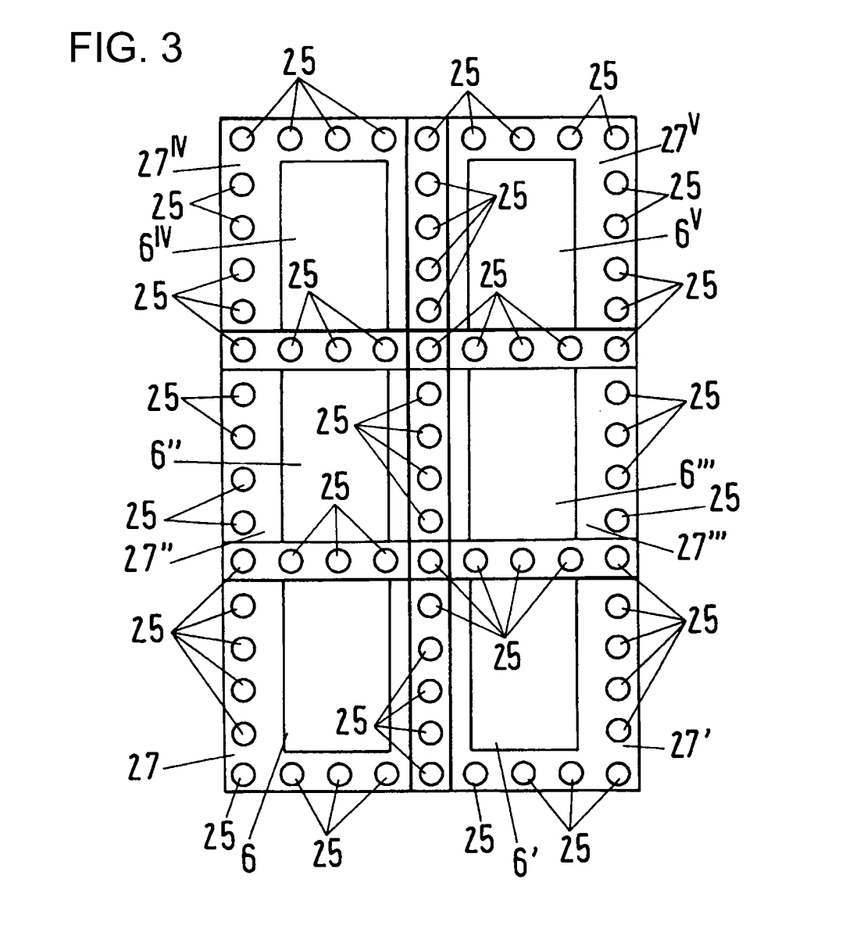
FIG. 3 is a view of the imaging regions and configuration of a luminous device of an alternative embodiment of a document acquisition system.

FIG. 3 diagrammatically shows a representation of a configuration of optical sensors $6\text{-}6^V$, a luminous device 25 and associated imaging regions $27\text{-}27^V$. In this case, the individual imaging regions $27\text{-}27^V$ in each case overlap the adjoining imaging regions $27\text{-}27^V$. It is thus even possible to subsequently align the individual imaging regions $27\text{-}27^V$ with respect to one another using an image processing algorithm in the case of mechanical misalignment of one of the optical sensors $6\text{-}6^V$ or of a plurality of optical sensors $6\text{-}6^V$ or of one of the elements of the optical imaging unit, for example of one or more of the imaging microlens arrays (especially if they are not formed on a common substrate which serves as a carrier). In the embodiment shown in FIG. 3, luminous devices 25 of various types, i.e. luminous devices 25 which emit electromagnetic radiation of varying spectral ranges, are in each case disposed in a neighboring fashion and between the optical sensors. These luminous devices can be selectively driven in such a way that the document can be lit by using electromagnetic radiation of varying spectral distribution in an alternative manner, i.e. temporally offset, or at the same time. The optical lighting unit is correspondingly constructed in such a way that the lighting of the document is in each case homogeneous for the various spectral electromagnetic radiations. The individual luminous devices can furthermore be grouped together in such a way that lighting of the document under varying illumination angles is additionally or alternatively possible.

Figure 4:
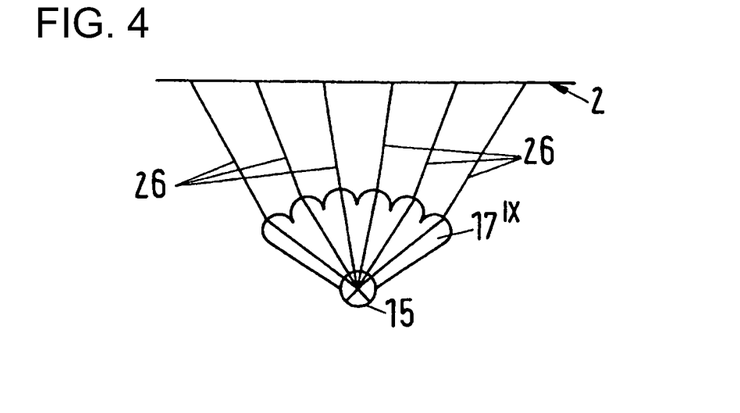
FIG. 4 is a sectional view of one embodiment of a lighting microlens array for a luminous device.

While it is assumed in the embodiment shown diagrammatically in FIG. 1 that the lighting microlens arrays 17, 17', 17" and imaging microlens arrays 9, 9' are formed in such a way that they are substantially flat, i.e. in one plane, other embodiments provide that at least the optical lighting unit includes microlens arrays having microlenses which are not disposed in a flat plane. FIG. 4 shows a section through a possible embodiment of such a lighting microlens array $17^{IX}$ which directs electromagnetic radiation (light 26) onto the document 2.

In one preferred embodiment, the microlenses of a lighting microlens array are in each case diverging lenses. In other embodiments the individual lenses may be converging lenses.

Figure 5:
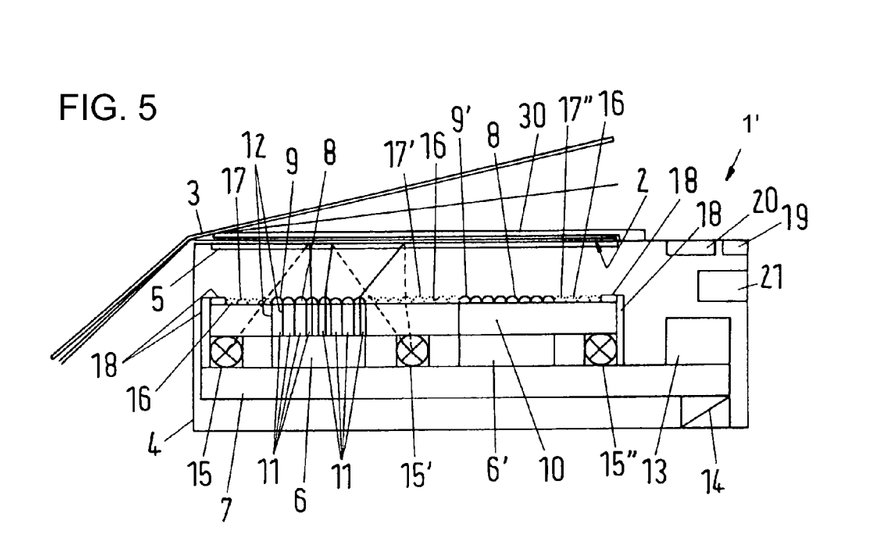
FIG. 5 is a view similar to FIG. 1 of a further document acquisition system for the verification of documents.

FIG. 5 shows another embodiment of a document acquisition system 1'. Identical technical features have the same reference signs as in FIG. 1. The embodiment of FIG. 5 differs from that of FIG. 1 in that a document cover 30 is disposed at the housing 4. The cover 30 can be formed integrally with the housing 4. It is used firstly as a guide for the document 2. The document cover 30 also ensures that the document 2 bears against the document placement surface 5 in an optimum fashion. Furthermore, any escape of electromagnetic radiation used to light the document 2 is prevented. Such a document cover 30 is advantageous especially when electromagnetic radiation in the UV spectral range is used in order to rule out any risk to the health of the operating personnel. This is also true when laser diodes are used as luminous devices for lighting. In those cases, especially the integral embodiment of the document cover 30 with the housing 4 is advantageous since unintentional opening of the document cover 30 is impossible. Guidance of the document is also made easier. Other embodiments may provide that the document cover is hinged onto the housing. In such embodiments, it is possible for one or more contact elements to be provided which monitor proper configuration of the document cover and prevent the use of the luminous device as desired, if improper configuration could cause a health hazard and/or does not ensure proper imaging for the verification of the document 2.

Figure 6:
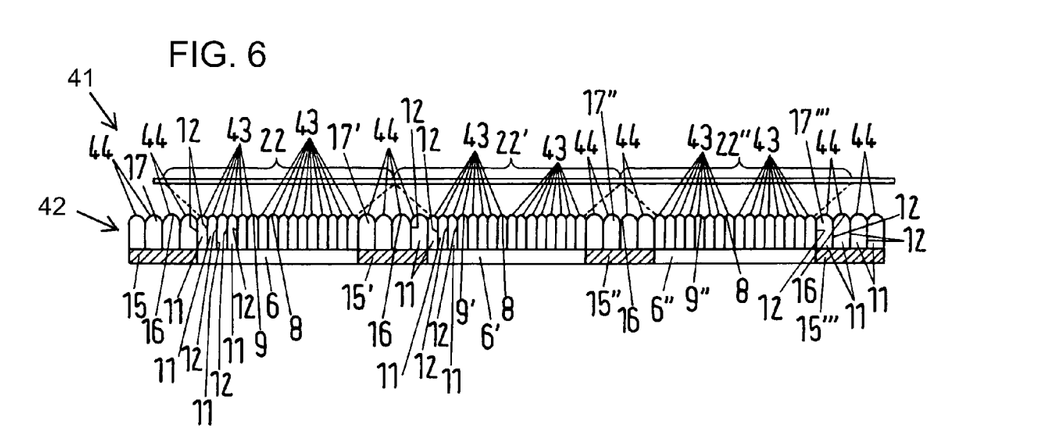
FIG. 6 is a view of an optical system of a further, very considerably simplified embodiment of a document acquisition system.

FIG. 6 shows an optical system 41 of another, very simplified embodiment of a document acquisition system. An object to be imaged, such as a document 2, is disposed at a distance above a microlens array configuration 42 which includes imaging microlens arrays 9, 9', 9" of an optical imaging unit 8 and lighting microlens arrays 17, 17', 17", 17'" of an optical lighting unit 16. In this embodiment, microlenses 43 of the optical imaging unit 8 and microlenses 44 of the optical lighting unit 16 are formed integrally from the same material as a substrate 10. Furthermore, the optical channels 11 which are associated with the microlenses 43 and 44 are formed in the substrate in such a way that they are optically isolated with respect to one another. This means that they are separated from one another by wall layers 12 which are impermeable to electromagnetic radiation. For reasons of clarity, only some and not all of the wall layers are denoted by way of example with the reference sign 12 in FIG. 6. The imaging microlens arrays 9, 9', 9" and the lighting microlens arrays 17, 17', 17", 17'" are integrally formed together in the microlens array configuration 42. The individual imaging microlens arrays 9, 9', 9" are in this case constructed in such a way that their acquisition regions 22, 22', 22" mutually adjoin if the document 2 is aligned at a predetermined spacing parallel to the microlens array configuration 42. The imaging microlens arrays 9, 9', 9" thus ensure imaging of the document 2 onto optical sensors 6, 6', 6" and the lighting microlens arrays 17, 17', 17", 17'" ensure the guidance of electromagnetic radiation which is transmitted by luminous devices 15, 15', 15", 15'" onto the document 2. In order to be able to differentiate between the lighting microlens arrays 17, 17', 17", 17'" and the imaging microlens arrays 9, 9', 9", the microlenses 43 of the imaging microlens arrays 9, 9', 9" and their channels 11 are narrower than the microlenses 44 of the lighting microlens arrays 17, 17', 17", 17'" and their channels 11. The person skilled in the art gathers therefrom that this is meant to specify neither a geometric embodiment nor a numerical ratio of the microlenses 43 of the imaging microlens arrays 9, 9', 9" and of the microlenses 44 of the lighting microlens arrays 17, 17', 17", 17'".

The person skilled in the art will appreciate that the illustrated embodiments are intended to be merely exemplary. Especially the grid-type configuration of the optical sensors and the configuration of the luminous devices can be matched to the respective requirements. However, since both the documents and the optical sensors are usually rectangular, the grids will likewise preferably represent a rectangular or square pattern.

The invention claimed is:

1. A document acquisition system for optically acquiring a document, the document acquisition system comprising:
   at least one luminous device for illuminating the document;
   an optical lighting unit coupled to said at least one luminous device for permitting homogeneous lighting of the document;
   at least one optical sensor;

an optical imaging unit for imaging the document onto said at least one optical sensor;

further optical sensors disposed together with said at least one optical sensor in a grid;

an imaging microlens array associated with said at least one optical sensor;

further imaging microlens arrays each being associated with a respective one of said further optical sensors;

further luminous devices disposed with said at least one luminous device next to one other and/or between said at least one optical sensor and said further optical sensors;

said optical lighting unit including at least one lighting microlens array for said at least one luminous device and further lighting microlens arrays each for a respective one of said further luminous devices; and said imaging microlens array and/or said further imaging microlens arrays and said at least one lighting microlens array and/or said further lighting microlens arrays being mechanically connected to one another.

2. The document acquisition system according to claim 1, which further comprises a carrier material, said imaging microlens array and/or said further imaging microlens arrays and said at least one lighting microlens array and/or said further lighting microlens arrays being formed together on said carrier material.

3. The document acquisition system according to claim 1, which further comprises at least one additional luminous device coupled to said optical lighting unit for additionally or alternatively lighting the document using radiation emitted by said at least one additional luminous device, said at least one additional luminous device emitting the electromagnetic radiation with a spectrum differing from a spectrum of electromagnetic radiation of said at least one luminous device and/or said further luminous devices.

4. The document acquisition system according to claim 3, wherein said at least one luminous device, said further luminous devices and/or said at least one additional luminous device are in the form of LEDs or laser diodes.

5. The document acquisition system according to claim 3, wherein said optical lighting unit is configured in such a way that the document can be lit simultaneously or in a temporally offset manner using the electromagnetic radiation of said at least one luminous device and of said further luminous devices at a first illumination angle and the electromagnetic radiation of said at least one additional luminous device at a second illumination angle different than the first illumination angle.

6. The document acquisition system according to claim 1, wherein at least one microlens of said optical lighting unit corresponds to each document region imaged by a microlens of said optical imaging unit.

7. A method for optically acquiring a document using a document acquisition system, the method comprising the following steps:

lighting the document with at least one luminous device and an optical lighting unit coupled to the at least one luminous device for lighting the document homogeneously;

imaging the document onto at least one optical sensor with an optical imaging unit;

acquiring an image of the document with the at least one optical sensor;

providing an imaging microlens array associated with the at least one optical sensor, further optical sensors disposed together with the at least one optical sensor in a grid and further imaging microlens arrays each associated with a respective one of the further optical sensors, for carrying out the step of acquiring the image of the document with the at least one optical sensor;

providing further luminous devices disposed next to one another and/or between the at least one optical sensor and the further optical sensors, for carrying out the step of lighting of the document along with the at least one luminous device;

providing the optical lighting unit with at least one lighting microlens array for the at least one luminous device and further lighting microlens arrays each for a respective one of the further luminous devices, for carrying out the step of lighting the document; and mechanically connecting the imaging microlens array and/or the further imaging microlens arrays and the at least one lighting microlens array and/or the further lighting microlens arrays to one another.

8. The method according to claim 7, which further comprises:

additionally or alternatively lighting the document with electromagnetic radiation emitted by at least one additional luminous device coupled to the optical lighting unit; and emitting the electromagnetic radiation from the at least one additional luminous device with a spectrum differing from a spectrum of electromagnetic radiation of the at least one luminous device and/or the further luminous device.

9. The method according to claim 8, which further comprises lighting the document simultaneously or in a temporally offset manner using electromagnetic radiation of the at least one luminous device and of the further luminous devices at a first illumination angle and the electromagnetic radiation of the at least one additional luminous device at a second illumination angle different than the first illumination angle.

10. The method according to claim 7, which further comprises lighting each document region of the document, imaged by a microlens of the optical imaging unit, with at least one microlens of the optical lighting unit.

* * * * *